United States Patent [19]

Bizer et al.

[11] Patent Number: 4,979,311

[45] Date of Patent: Dec. 25, 1990

[54] INSTRUMENT FOR DETERMINING THE SETTING OF A LENS EDGER DEVICE TO PRODUCE A PROPERLY SIZED LENS

[76] Inventors: Jerry L. Bizer; Raymond D. Carrig, Jr., both of 516 E. Highway 131, both of Clarksville, Ind. 47130

[21] Appl. No.: 493,332

[22] Filed: Mar. 14, 1990

[51] Int. Cl.⁵ ............................................. G01B 5/00
[52] U.S. Cl. ........................................ 33/507; 33/200
[58] Field of Search ................................... 33/200, 507

[56] References Cited

U.S. PATENT DOCUMENTS

| | | | |
|---|---|---|---|
| 3,145,417 | 8/1964 | Shatzel | 33/507 X |
| 3,457,652 | 7/1969 | Moffett | 33/507 X |
| 4,707,929 | 11/1987 | Bizer et al. | 33/507 |

Primary Examiner—Harry N. Haroian
Attorney, Agent, or Firm—Charles G. Lamb

[57] ABSTRACT

An instrument for use in optical laboratories for indicating the setting of a lens edger device based upon the relationship between a lens pattern or dummy lens and the lens opening of a spectacle frame into which a finished lens is to fit. The instrument can be used to determine the lens edger setting to produce a finished lens to fit both rimmed spectacle frames and rimless spectacle frames. The instrument gauges the size of the spectacle frame lens opening in relationship to either the lens pattern in the event of fitting a lens to rimmed spectacle frames, or a dummy lens in the event of fitting a lens to rimless spectacle frames.

10 Claims, 2 Drawing Sheets

INSTRUMENT FOR DETERMINING THE SETTING OF A LENS EDGER DEVICE TO PRODUCE A PROPERLY SIZED LENS

BACKGROUND OF THE INVENTION

The present invention relates to apparatus for the preparation of lenses for eyeglasses prior to the edge shaping of the lenses, and more particularly to a device for determining the setting of a lens edger device.

The manufacturers of spectacle frames also provide lens patterns having a peripheral configuration corresponding to the peripheral configuration of the lens to be mounted in the spectacle frame. However, these lens patterns are not necessarily of the proper peripheral dimension to fit the lens openings of the spectacle frame. Lens patterns are typically used in conjunction with a lens edger device as a template to guide the lens edger device for forming a lens which is of the proper peripheral configuration to fit the lens opening of spectacle frames. The lens edger must be adjusted or set in order to form a lens which is of the proper peripheral size to fit the frame lens opening. Thus, the peripheral size of the lens opening of the spectacle frame must be determined in relationship to the lens pattern so that the lens edge device can be set to make a lens of the proper peripheral size and configuration.

A number of devices have been proposed for accomplishing this task. One example of a device for indicating the set size for a lens edger device required to edge grind the lens to fit the lens opening of a spectacle frame is shown in U.S. Pat. No. 3,457,652 issued on July 29, 1969 to Robert L. Moffett. The device includes two parallel slides mounted on a base, the top slide having a lens pattern abutment plate at one end and an index mark. The bottom slide has a scale along one edge and a spectacle lens opening engagement pin attached thereto. The base has a lens pattern abutment adjacent the end of the top slide having the lens pattern abutment, and a spectacle lens opening engagement pin in alignment with a lens opening engagement pin on the bottom slide. A lens pattern is positioned adjacent to the top slide between the lens pattern abutment on the top slide and lens pattern abutment on the base and the top slide is moved toward the lens pattern until both lens pattern abutments are in contact with opposite sides of the lens pattern. A spectacle frame is positioned at one end of the bottom slide with the lens opening abutment pins in diametrically opposed engagement with a lens opening of the spectacle frame. The index on the top slide then cooperates with the scale on the bottom slide to indicate the set size reading of the bevel edger required to produce a lens to fit the spectacle lens opening.

The above described device cannot be used to determine the lens edger device setting required for making lenses for rimless spectacles. In addition, the above described device has no provision for checking the accuracy of a lens pattern before it is used to determine the setting of the lens edger device.

An example of an instrument determining the setting of a lens edger device to produce a lens is disclosed in our U.S. Pat. No. 4,707,929 issued on Nov. 24, 1987. While this instrument works very well, some difficulty has been experienced in use in gauging the longest transverse dimension of the lens pattern and the spectacle frames lens opening because in many instances this longest transverse dimension is not on the horizontal axis of the lens pattern or the spectacle frame lens opening.

SUMMARY OF THE INVENTION

It is an object of the present invention to provide an instrument for determining the setting of a lens edger device for making finished lens for both rimmed and rimless spectacles.

It is a further object of the present invention to provide for the checking of the accuracy of the lens pattern.

It is still yet another object of the present invention to provide transverse dimensions of a lens pattern and spectacle frame lens opening.

More particularly, the present invention provides an instrument for determining the setting of a lens edger device based upon the relationship between a lens pattern and the lens opening of a spectacle frame or a dummy lens, comprising a base member, a pattern slide member having a lens pattern abutment at one of its ends and slidably mounted to the base member for linear movement in both directions along the longitudinal axis of the pattern slide member, means for both locating, retaining and rotating a lens pattern adjacent the lens pattern abutment end of the pattern slide member with the longest transverse axis of the lens pattern at different selected angles relative to the path of movement of the pattern slide member, lens pattern abutment means on the base member located adjacent the lens pattern abutment end of the pattern slide member and spaced to the opposite side of the lens pattern locating, retaining and rotating means from the pattern abutment end of the pattern slide member, a spectacle frame slide member slidably mounted to the base member for linear movement in both directions along the longitudinal axis of the frame slide member parallel to the path of movement of the pattern slide member, spectacle frame lens opening engagement means located at the one end of the spectacle frame slide member adjacent the lens pattern abutment end of the pattern slide member for engaging the spectacle frame at one end of the longest transverse axis of the lens opening, spectacle frame lens opening engagement means on the base member for engaging the spectacle frame at the other end of the longest axis of the lens opening, a lens edger set size scale on the pattern slide member extending in the direction of the linear movement of the pattern slide member, and index means on the spectacle frame slide member for registering with the lens edger set size scale to indicate the setting for the lens edger device to produce a lens to fit the spectacle frame opening corresponding in shape to the lens pattern.

BRIEF DESCRIPTION OF THE DRAWINGS

A better understanding of the invention and its advantages will be had upon reference to the following description in conjunction with the accompanying drawings in which like numerals refer to like parts throughout the several views and wherein.

DETAILED DESCRIPTION OF THE PREFERRED EMBODIMENT

Figure 1:
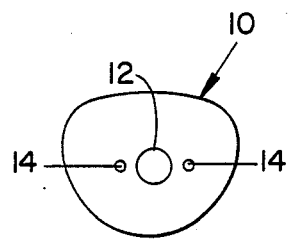
FIG. 1 is a plan view of a typical lens pattern.

With reference to FIG. 1, there is shown a lens pattern 10 of the type commercially available and typically used in the manufacture of spectacle lens. The lens pattern 10 is used in a conventional lens edger device (not shown) in a manner well known in the art to guide the grinding or cutting wheel of the edger device so as to duplicate the peripheral configuration of the lens pattern 10 to the finished lens being edged by the edger device. Typically lens patterns 10 include a centered through bore 12 to receive the arbor of the edger device and two small apertures 14 spaced equal distance to either side of the through bore 12 for receiving locating pins of the edger device. The locating apertures 14 are on the horizontal centerline of the lens pattern 10.

Now turning to FIGS. 2 and 3, there is shown the instrument 16 for determining the setting of a lens edger device based upon the relationship between a lens pattern 10 and either the lens opening of a spectacle frame 18 (shown in FIG. 4) or a dummy lens 20 (shown in FIG. 5) as will be hereinafter explained.

The instrument 16 includes a base member 22 having a first elongated slot 24 formed therein and a second elongated slot 26 formed therein substantially parallel to and spaced apart from the first elongated slot 24.

A lens pattern slide member 28 is positioned on the top surface of the base member 22 over the first slot 24 and has a depending pin 30 which is received in the first slot 24. The depending pin 30 has an enlarged head which abuts the bottom surface of the base member 22 to retain the pin 30 in the first slot 24. The lens pattern slide member 28 is thusly slidably mounted to the base member 22 for linear movement in both directions along the path of the longitudinal axis of the elongated first slot 24. The lens pattern slide member 28 has a lens pattern abutment 33 located at one of its ends. As shown, the lens pattern abutment 33 is formed by the transverse end of the lens pattern slide member 28.

A spectacle frame slide member 34 is positioned on the top surface of the base member 22 over the second elongated slot 26 and has depending pin 36 which is received in the second elongated slot 26. The depending pin 36 has an enlarged head which abuts the bottom side of the base member 22 to retain the pin 36 in the second slot 26. The spectacle frame slide member 34 is thusly slidably mounted to the base member 22 for linear movement in both directions along the path of the longitudinal axis of the second slot 26 parallel to the path of movement of the lens pattern slide member 28. The spectacle frame slide member 34 has a lens pattern or dummy lens abutment 40 located on one end of the spectacle frame slide member 34 and a finished lens abutment 41 located on the opposite end of the spectacle frame slide member 34. As shown, the lens pattern or dummy lens abutment 40 is formed by one transverse end of the spectacle frame slide member 34.

A pattern scale 42 is located on the base member 22 adjacent to and extending along the linear path of movement of the lens pattern slide member 28. The pattern scale 42 is centered on the transverse center of the path of movement of the lens pattern slide member 28 and is used to measure the longest horizontal dimension of the lens pattern 10. The function of this pattern scale 42 is to measure the lens pattern 10, as will hereinafter be discussed. It should be noted that the inclusion of the pattern scale 42 in the instrument 10 is optional.

Figure 2:
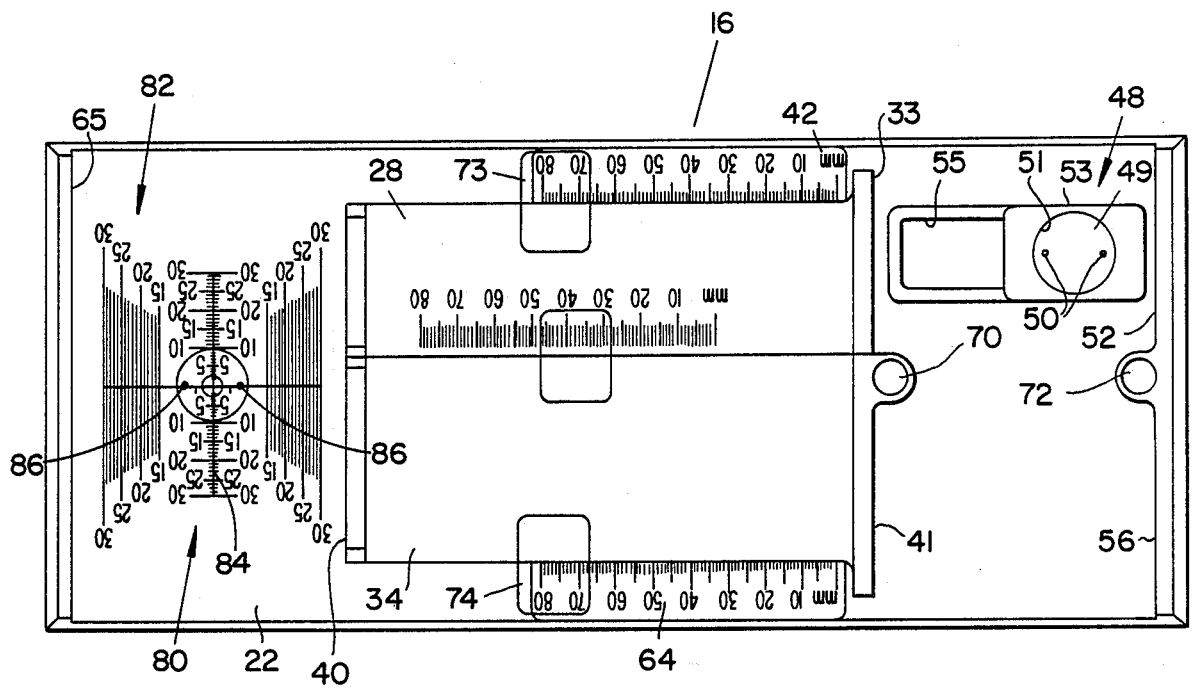
FIG. 2 is a plan view of the instrument of the present invention.
Figure 3:
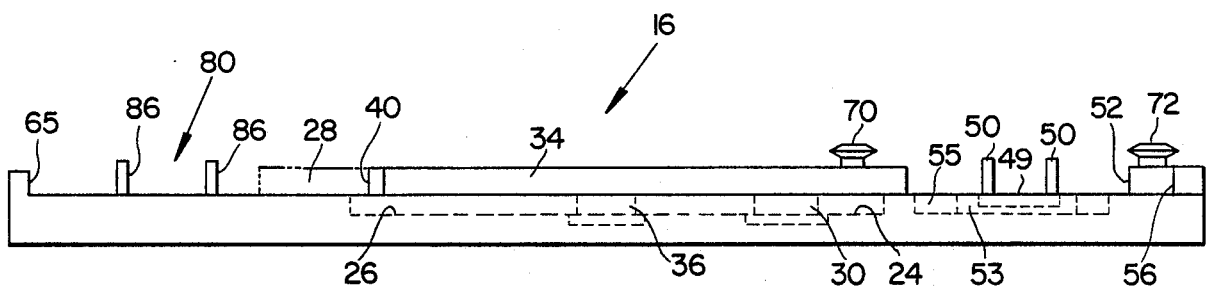
FIG. 3 is a side view of the instrument as seen in the direction of arrows 3—3 in FIG. 2.

With continued reference to FIG. 2, the instrument 16 also includes rotatable pattern holder means, generally denoted as the numeral 48, for locating, retaining and rotating lens pattern 10 adjacent the lens pattern abutment end 33 of the lens pattern slide member 28. The rotatable pattern holder means 48 is used to rotate the lens pattern 10 so that the transverse axis of the lens pattern can be oriented at various selected angles relative to the longitudinal axis of the lens pattern or hold the lens slide member 28 with its transverse axis in alignment with the path of movement of the lens pattern slide member 28. The rotatable pattern holder means 48 is shown as comprising a rotatable mounting plate 49 with a pair of spaced apart locating pins 50 projecting upwardly from the top surface of the plate 49. The distance between locating pins 50 corresponds to the distance between the locating apertures 14 of the lens pattern 10 and are sized and configured to be received in the lens pattern locating apertures 14. The rotatable mounting plate 49 is circular in peripheral configuration and fits into a cylindrical pocket 51 in a slide plate 53 for rotation therein. The slide plate 53 is mounted in an elongated slide plate receiving slot 55 for linear movement in the slide plate receiving slot 55. The slide plate receiving slot 55 is formed in the base member 22 with its longitudinal axis in alignment with the longitudinal axis of the pattern slide 28. Preferably, the rotatable mounting plate 49 is not freely rotatable within the circular pocket 51, but is rotatable in arcuate increments of, for example, 45 degrees.

Figure 4:
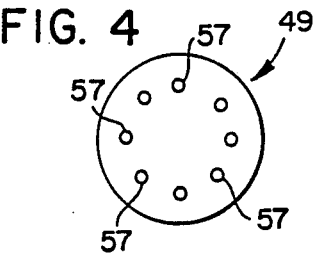
FIG. 4 is a bottom view of a component of the instrument of the present invention.
Figure 5:
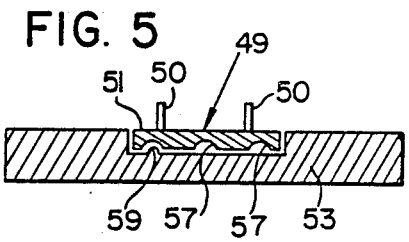
FIG. 5 is a cross-sectional side view of the component of FIG. 4.

With reference to FIGS. 4 and 5, the incremental movement of the rotatable mounting plate 49 is provided by increment determining means which includes a plurality of circumferentially spaced apart indentations 57 formed in the bottom side of the rotatable plate 49 concentric with the rotatable plate 49, and at least one detent 59 projecting upwardly into the cylindrical pocket 51 from the bottom wall of the cylindrical pocket 51 which is positioned and sized to releasably engage one of the indentations 57. Therefore, the rotatable pattern plate 49 is moved in increments of for example, 45 degrees at a time before the detent 59 engages one of the indentations 57. It should be noted, that one of the positions of the rotatable mounting plate 49 at which the detent 59 engages one of the indentations 57 is when the two locating pins 50 are in alignment with the longitudinal axis of the pattern slide 28.

The rotatable pattern holder 48 is movable in the elongated slot 55 between the lens pattern abutment end 33 of the pattern slide member 28 and lens pattern abutment flange 52 to provide more or less space between the lens pattern abutment flange 52 and the locating pins 50 of the rotatable pattern holder 48 so that lens patterns 10 of various sizes can be accomodated.

The instrument 16 has lens pattern abutment means, generally denoted as the numeral 52, on the base member 22 adjacent the lens pattern abutment end 33 of the first slide member 28 and spaced to the opposite side of the lens pattern holder means 48 from the abutment end 33 of the pattern slide member 28. The lens pattern abutment means 52 is shown as an upstanding flange on the base member 22

The instrument 16 also has a lens pattern/dummy lens abutment means, generally denoted as the number 65, on the base member 22 located at one end of the path of movement of the frame slide member 34 adjacent the transverse lens pattern/dummy lens abutment end 40 of the frame slide member 34. The lens pattern/dummy lens abutment means 65 is shown as an upstanding flange.

The instrument 16 also has a finished lens abutment means, generally denoted as the number 56, such as an upstanding flange on the base member 22 located at the end of the path of movement of the frame slide member 34 adjacent the finished lens abutment end 41 of the second slide member 34.

A frame scale 64 is located on the base member 22 adjacent to and extending along the linear path of movement of the frame slide member 34. The function of the frame scale 64 is to measure the finished lens to check for accuracy as will hereinafter be discussed. It should be noted that the inclusion of the frame scale 64 in the instrument 10 is optional.

Spectacle frame lens opening engaging means 70 is positioned and affixed on the frame slide member 34 proximate the end of the slide member 34 having the finished lens abutment 41, that is the end opposite the transverse dummy lens abutment end 40, and similar spectacle frame lens opening engaging means 72 is affixed to the base member 22 in alignment with the lens opening engagement means 70 along the path of movement of the frame slide member 34. As shown, lens opening engagement means 70 and 72 are upstanding mushroom shaped pins having a distal end configured to be seated in the groove of the frame lens opening. As can be best seen in FIG. 6, the lens opening engagement pins 70 and 72 engage the lens opening of the spectacle frame 18 transversely of the lens opening in the manner of inside calipers.

Figure 6:
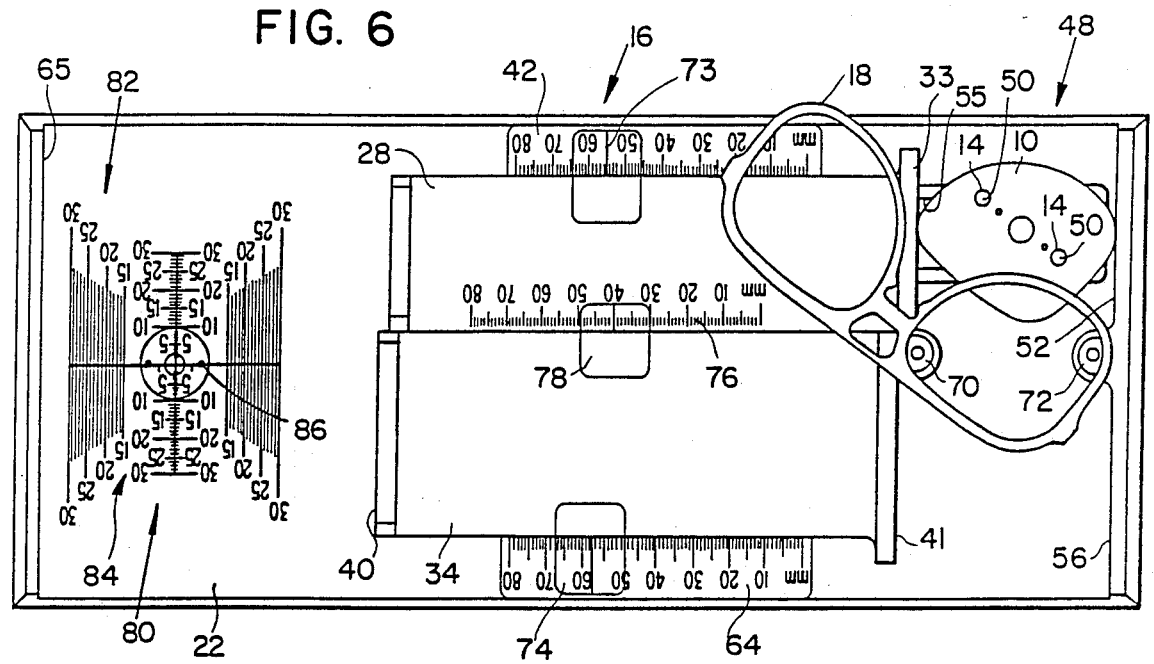
FIG. 6 is a plan view of the instrument of FIG. 2 in use for determining the lens edger set size for a particular lens for a particular spectacle frame; and, FIG. 7 is a plan view of the instrument of FIG. 2 in use for determining the lens edger set size for a lens.

A pattern scale index 73 is located on the pattern slide member 28 for registering with the pattern scale 42 to indicate the longest transverse dimension of the lens pattern 10 positioned or the rotatable pattern holder 48 at the end of the pattern slide member 28 to measure the actual dimension of the lens pattern 10 to verify the size of the lens pattern for accuracy as can be best seen in FIG. 6.

A frame scale index 74 is located on the frame slide member 34 for registering with the frame scale 64 to indicate the longest transverse dimension of the finished lens positioned on the base member 22 between the finished lens abutment flange 56 and the finished lens abutment 41 on the end of the frame slide member 34 to measure the actual transverse dimension of the finished lens 77 to verify that the lens grinding machine is actually producing a finished lens 77 to the proper size as can be best seen in FIG. 6.

An edger set size scale 76 is located on one or the other of the pattern slide member 28 or frame slide member 34, and a set size index 78 is located on the other one of the slide members 28 and 34 which does not include the third scale means 76 for registering with the edger set size scale 76. As shown, the edger set size scale 76 is located on the pattern slide member 28 adjacent the frame slide member 34, and the set size index 78 is located on the frame member 34 adjacent to the edger set size scale means 76. The set size index 78 registers with the edger set size scale 76 to indicate the lens edger device setting to produce a finished lens to fit the spectacle lens opening corresponding in shape to the lens pattern 10.

A pattern grid scale 80 is located on the top surface of the base member 22 between the lens pattern or dummy lens abutment flange 65 and transverse dummy lens abutment end 40 of the frame slide member 34. The pattern grid scale 80 is in the form of two intersecting series of graduated measurement marks identified by numerals 82 and 84. The horizontal series 82 is used to measure the horizontal dimension of a lens pattern 10 and the vertical series 84 is used to measure the vertical dimension of a lens pattern 10. In order to properly position a lens pattern over the pattern grid scale 80, a pair of spaced apart locating pins 86 are affixed to the base member 22 projecting upwardly from the top surface of the base member 22. The distance between the locating pins 86 corresponds to the distance between the locating apertures 14 of the lens pattern 10 and are sized and configured to be received in the lens pattern locating apertures 14. The pair of locating pins 86 lay on the horizontal scale series 82 and are centered on the vertical scale series 84. The pattern grid scale 80 is also used to verify the size of the lens pattern 10 and check the accuracy of the locations of the locating apertures 14 of the lens pattern 10.

In some styles of spectacles, the longest transverse dimension of the lens opening and, therefore, the lens pattern 10 is substantially the horizontal axis. In other styles the longest transverse dimension is at an oblique angle to the horizontal.

In one mode of operation, to determine the lens edger setting required to make a finished lens having its longest transverse dimension horizontal axis across the lens pattern 10 to fit a rimmed pair of spectacles, the lens pattern 10 is positioned on the pair of lens pattern locating pins 50 of the rotatable pattern mounting plate 49 which has been rotated in its pocket 51 such that the common axis between the pins 50 is parallel to the path of movement of the pattern slide member 28 (see Figure 2), and the pattern 10 abutment with the upstanding lens pattern abutment flange 52. The pattern slide member 28 is moved to the right as seen in FIG. 2 until the lens pattern abutment 33 on the end of the pattern slide member 28 contacts the lens pattern 10 to the opposite side thereof from the lens pattern abutment flange 33. Next, the rimmed spectacle frame 18 is positioned at the frame engagement pins 70 and 72 with the pins 70 and 72 horizontally diametrically contacting the lens opening of the frame. The lens edger setting is then read directly from the edger set size scale 76 where the set size index 78 registers with the edger set size scale 76. The actual longest horizontal dimension of the lens pattern 10 can be read directly from the pattern scale 42 where the pattern index 73 registers with the pattern scale 42.

With reference to FIG. 6, in another mode of operation to determine the lens edger setting required to make a finished lens havings its longest transverse dimension at an oblique angle to the horizontal axis of the lens pattern 10 to fit a rimmed pair of spectacles, the lens pattern 10 is positioned on the pair of lens pattern locating pins 50 of the rotatable pattern mounting plate 49 which has been rotated in its pocket 51 such that the common axis between the pins 50 is at an angle, for example, 45 degrees, to the path of movement of the pattern slide member 28, and with the pattern 10 in abutment with the upstanding lens pattern abutment flange 52. The pattern slide member 28 is moved to the right as seen in FIG. 5 until the lens pattern abutment 33 on the end of the pattern slide member 28 contacts the lens pattern 10 to the opposite side thereof from the lens pattern abutment flange 33. Next, the rimmed spectacle frame 18 is positioned at the frame engagement pins 70 and 72 obliquely contacting the lens opening of the frame across the longest transverse dimension of the frame lens opening. The lens edger setting is then read directly from the edger set size scale 76 where the set size index means 78 registers with the edger set size scale 76.

The longest transverse dimension of an existing lens removed from an existing spectacle frame can be determined by placing the lens in the instrument 16 in the position of the lens pattern 10 between and in abutment with both the lens pattern abutment end 33 of the pattern slide member 28 and the lens pattern abutment flange 52 and reading the dimension from the pattern scale 42 at the pattern scale index 73.

Figure 7:
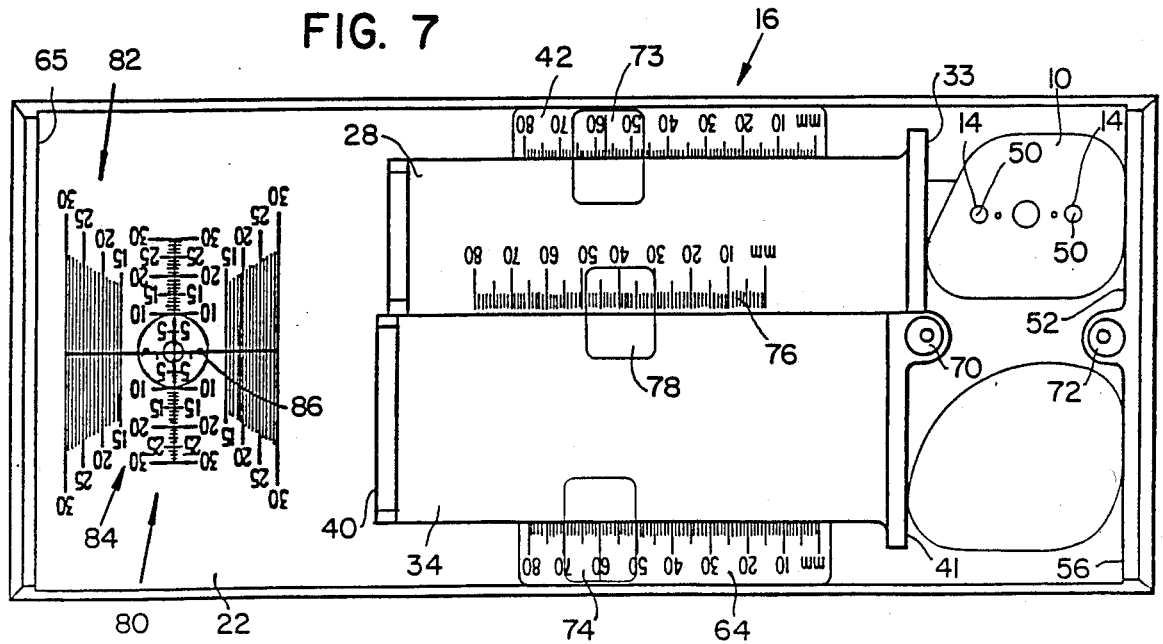

With reference to FIG. 7, to determine the lens setting required to make a finished lens to fit a rimless pair of spectacles, the lens patter 10 is positioned on the pair of lens pattern pins 50, as discussed above, and the dummy lens 20 previously removed from the rimless spectacle frame is positioned on the base member 22 between the lens abutment 41 of the frame slide 34 and the lens abutment flange 56. The frame slide member 34 is moved to the right until the dummy lens is in abutment with both the lens abutment 41 of the second slide 34 and the lens abutment 56 of the base member 22. The lens edger setting is then read directly from the set size indicator scale 76 where the set size index 78 registers with the set size indicator scale 76.

To check the accuracy of the lens pattern 10 prior to use in determining the edger device setting, the lens pattern is placed over the pattern grid scale 80 with the locating pins 86 received in the apertures 14 of the lens pattern 10 thusly properly locating the lens pattern 10 over the pattern grid scale means 80. The horizontal and vertical measurements of the lens pattern 10 can then be read where the periphery of the lens pattern 10 crosses the horizontal series of marks 82 and vertical series of marks 84 of the fourth scale means 80.

The foregoing detailed description is given primarily for clearness of understanding and no unnecessary limitations are to be understood therefrom for modifications will become obvious to those skilled in the art upon this disclosure and can be made without departing from the spirit of the invention and scope of the appended claims.

What is claimed:

1. An instrument for determining the setting of a lens edger device based upon the relationship between a lens pattern and the lens opening of a spectacle frame or dummy lens, comprising:
   a base member;
   a pattern slide member having a lens pattern abutment at one of its ends and slidably mounted to the base member for linear movement in both directions along the longitudinal axis of the pattern slide member;
   rotatable pattern holder means attached to the base member for both locating and retaining a lens pattern adjacent the lens pattern abutment end of the pattern slide member for orienting the longest transverse axis of the lens pattern selectively in a first position in alignment with the path of movement of the pattern slide member in a second position at an angle to the path of movement of the pattern slide member and a third position perpendicular to the path of movement of the pattern slide member, said rotatable pattern holder means comprise a rotatable mounting plate; a pair of spaced apart lens pattern locating pins projecting upwardly from the rotatable mounting plate; and, means for supporting the rotatable mounting plate to the base member for lateral movement in the direction toward and away from the pattern slide member;
   lens pattern abutment means on the base member located adjacent the lens pattern abutment end of the pattern slide member and spaced to the opposite side of the rotatable pattern holder means from the pattern abutment end of the pattern slide member;
   a frame slide member slidably mounted to the base member for linear movement in both directions along the longitudinal axis of the frame slide member along a path of movement parallel to the path of movement of the pattern slide member;
   first spectacle frame lens opening engagement means located at the one end of the frame slide member adjacent the lens pattern abutment end of the pattern slide member for engaging the spectacle frame at one side of the lens opening;
   second spectacle frame lens opening engagement means on the base member in alignment with the first spectacle frame lens opener engagement means for engaging the spectacle frame at the opposite side of the spectacle frame opening;
   an edger set size scale on one of the pattern slide or frame slide members extending in the direction of the linear path of movement of the slide member; and,
   a set size index means on the other one of the pattern slide member or frame slide member for registering with the edger set size scale to indicate the setting for the lens edger device to produce a lens to fit the spectacle frame openings corresponding in shape and size to the lens pattern.

2. The instrument of claim 1, wherein the rotatable pattern holder means is mounted to the base member for movement in the direction of movement of the pattern slide member.

3. The instrument of claim 1, wherein the first and second spectacle frame lens opening engagement means engage the spectacle frame at opposite ends of the longest transverse axis of the lens opening.

4. The instrument of claim 1, wherein the first spectacle frame opening engagement means is a post projecting upwardly from the frame slide member and the second spectacle frame lens opening engagement means is a post projecting upwardly from the base member.

5. The instrument of claim 1, further comprising a pattern scale on the base member adjacent the pattern slide member and a pattern scale index on the pattern slide member for registration therewith for indicating the transverse dimension of a lens pattern located on the lens rotatable pattern holder means.

6. The instrument of claim 1, further comprising
   a finished lens abutment on the base member;
   frame scale means located on the base member adjacent the frame slide member; and,
   a frame scale index on the frame slide member for registration with the frame scale means for indicating the transverse dimension of the finished lens located between and in contact with the abutment on the frame slide member and the abutment on the base member adjacent the frame slide member.

7. The instrument of claim 1, further comprising pattern verifying scale means for verifying the size and symmetry of the lens pattern.

8. The instrument of claim 1, wherein the means for supporting the rotatable mounting plate comprises a slide plate mounted to the base member for movement toward and away from the pattern slide member.

9. The instrument of claim 8, wherein the slide plate comprises a pocket formed therein sized and configured to receive the rotatable mounting plate.

10. The instrument of claim 1, further comprising increment means interconnecting the rotatable mounting plate and the means for supporting the rotatable mounting plate to limit the rotatable mounting plate to rotation in arcuate increments of a given degree.

* * * * *